Sept. 15, 1936.  C. W. KELSEY  2,054,129
AGRICULTURAL IMPLEMENT
Filed May 24, 1935   2 Sheets-Sheet 1
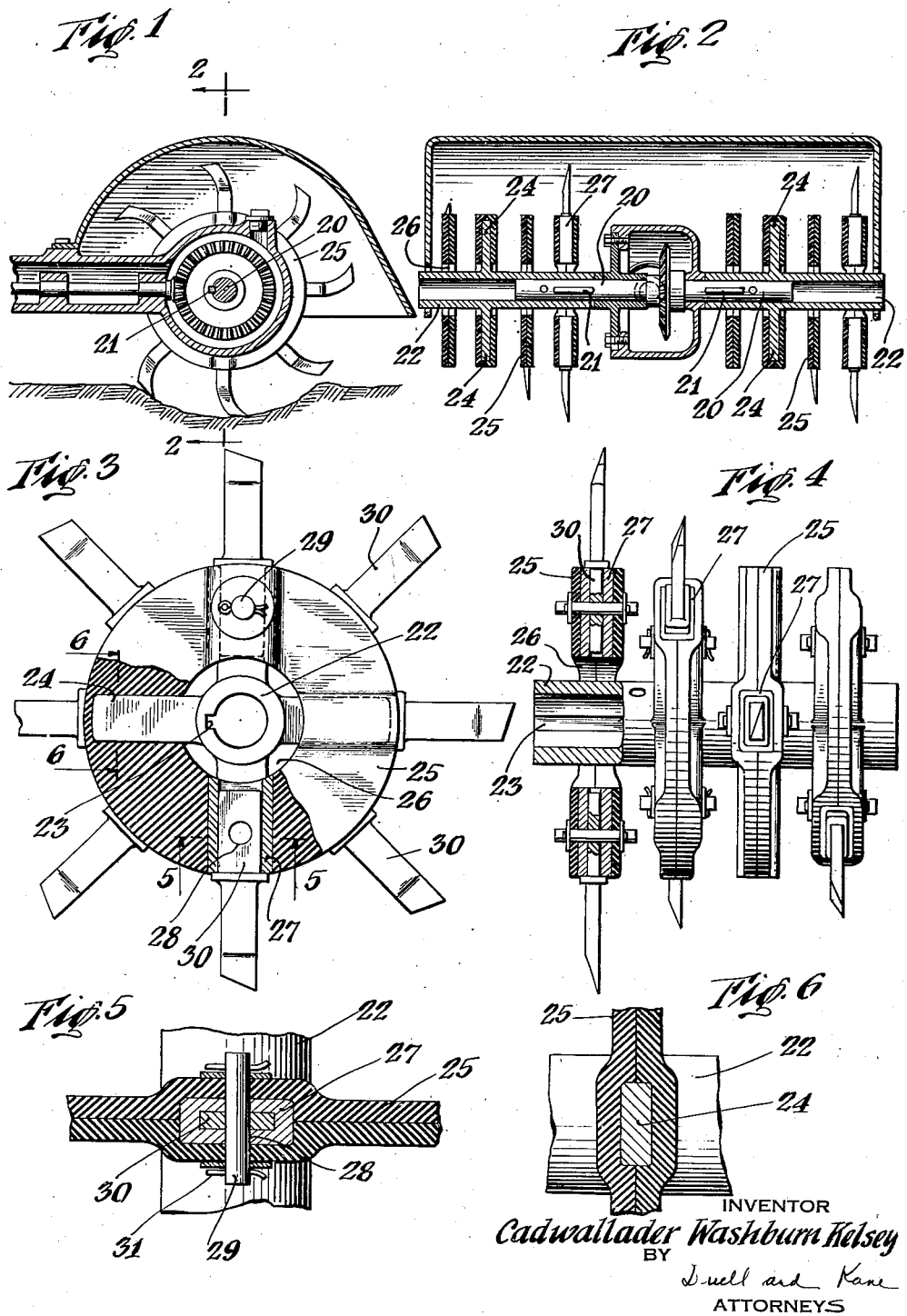
INVENTOR
Cadwallader Washburn Kelsey
BY
Duell and Kane
ATTORNEYS

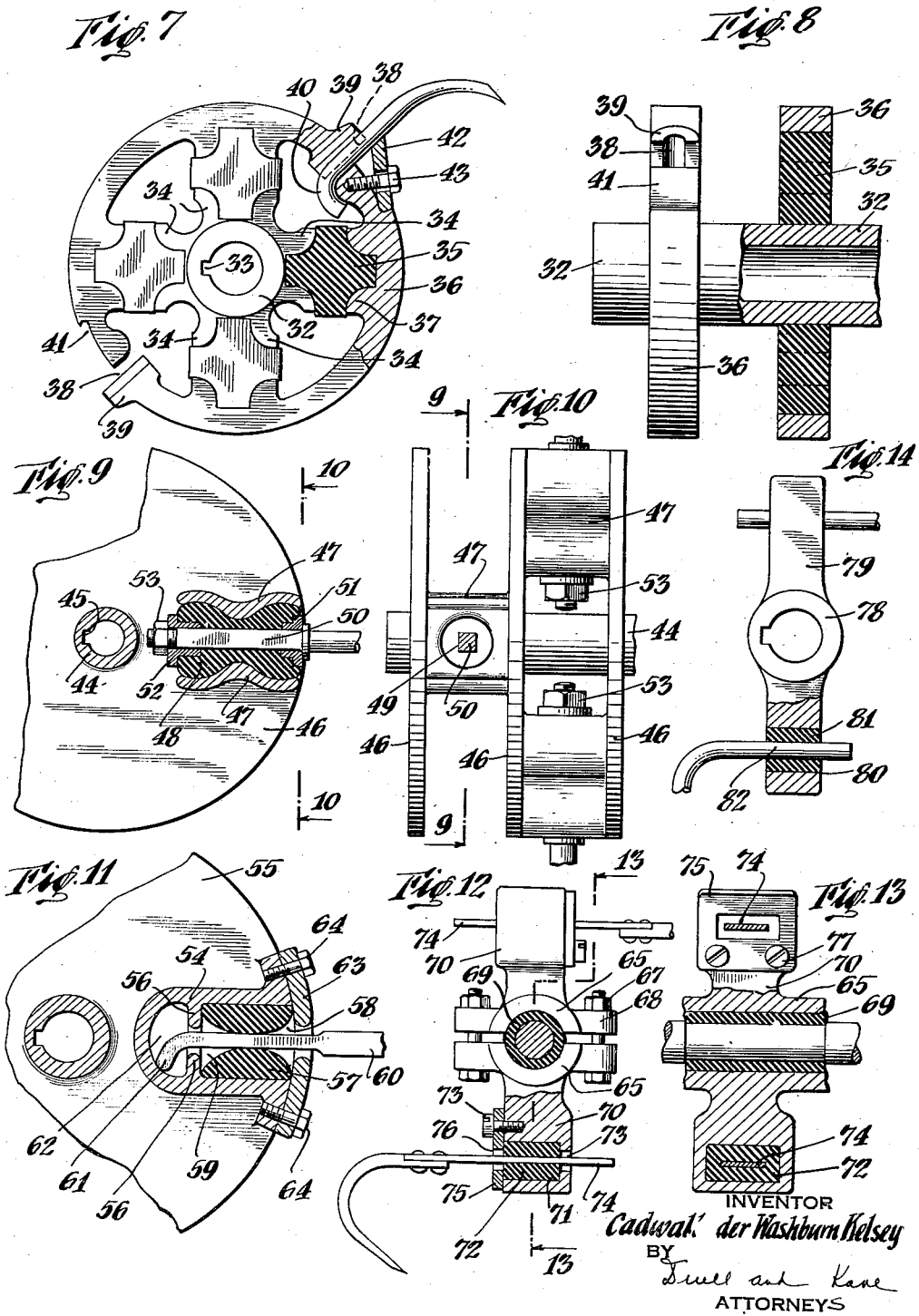

Patented Sept. 15, 1936

2,054,129

UNITED STATES PATENT OFFICE 2,054,129

AGRICULTURAL IMPLEMENT

Cadwallader Washburn Kelsey, Short Hills, N. J.

Application May 24, 1935, Serial No. 23,166

6 Claims. (Cl. 97—216)

This invention relates to a new and improved agricultural machine and particularly of the type adapted for use in connection with various tilling and soil preparing operations, as well as to new and improved tool mountings for use independently or in association with tilling machines.

It is an object of the invention to provide a machine of this character that will function with a high degree of efficiency in varying soil and ground conditions.

It is a further object to provide a shock-proof tool mounting which will add to the flexibility of the device in which it is employed and will prevent unnecessary or frequent breakage of tools or damage to the machine.

A still further object of the invention is to provide a tool mounting assembly which is rugged and simple in construction and permits of ready interchange of tool members with the expenditure of a minimum of effort.

With these and other objects in mind, reference is had to the accompanying drawings in which Fig. 1 is a longitudinal cross section of the rear end of an agricultural machine, showing the tilling apparatus in which is embodied one form of the invention;

Fig. 2 is a transverse cross section taken along the line 2—2 of Fig. 1;

Fig. 3 is an end view of the tilling apparatus shown in the preceding views and is partially broken away to disclose the inner structure thereof;

Fig. 4 is a partially broken away plan view of the same structure;

Fig. 5 is a cross section taken along the line 5—5 of Fig. 3;

Fig. 6 is a cross section taken along the line 6—6 of Fig. 3;

Fig. 7 is an end view of a tilling rotor, disclosing a slightly different embodiment of the invention, while Fig. 8 is a partially broken away plan view of the same structure;

Fig. 9 is an end view of still another form of tilling rotor taken through the line 9—9 in Fig. 10, and Fig. 10 is a plan view of the same;

Fig. 11 is an end view of a further form of rotor while

Fig. 12 discloses an additional form of tool mounting;

Fig. 13 is a view taken along the line 13—13 of Fig. 12, and

Fig. 14 discloses a simplified tool mounting containing a still further embodiment of the invention.

With particular reference to Figs. 1 through 6, numeral 20 indicates a driven shaft provided with a key-way for receiving a keying member 21. This shaft may be driven by a suitable train of gears enclosed in a usual form of housing and coupled to a source of power. Inasmuch as these latter elements form no part of the present invention, they will not be described in detail. Associated with the shaft 20 at either side of the gear casing are sleeves 22 which are formed with complementary key-ways 23 for association with the keys 21. Each of these shafts may be of any desired length although, in the preferred embodiment of the invention, their length is restricted in view of the fact that the outer ends of said sleeves are not supported. Associated with said sleeve and forming a part thereof are radially extending fins or arms 24 which are spaced laterally with respect to one another and at the same time are disposed about the surface of said sleeves so that no adjacent fins are aligned in the longitudinal direction of said sleeve. These fins may be formed of any desired material but are usually integral with the sleeve itself and are therefore preferably of steel or a steel alloy.

Encircling said sleeve and engaging the outer surfaces of said fins are discs 25 which are preferably formed of rubber, impregnated canvas or fiber, or other yielding material of inherent resiliency and great tensile strength. These discs may be formed in one piece, or, as disclosed, may be made of a series of laminations vulcanized or secured to one another and to the fins in any suitable fashion. As will be seen from Fig. 3, two or more opposed fin members or spokes may be used to support each disc unit, it being understood that the term "disc unit" may refer to either the laminated or one-piece structure above disclosed. At this point it will be additionally observed that each disc unit is spaced from the sleeve at 26 for a purpose hereinafter disclosed.

Associated with said discs and spaced at right angles to said fins are tool-receiving sockets 27 which are preferably formed of metal and are likewise imbedded in said disc and vulcanized thereto or secured in other suitable fashion. These sockets extend from the outer to the inner edges of the discs and may be open at both ends and with said discs are additionally provided with transverse openings 28 through which a clevis pin 29 may be passed for the purpose of holding a tool end 30 in place. A cotter pin 31 associated with the free end of said clevis pin serves to hold the latter against withdrawal. It is apparent that other structures might be substituted for holding the tool ends in place as, for example, set screws, or other means for holding the tool members against accidental displacement or withdrawal.

In operation, power transmitted to the shaft 21 will, in turn, cause the rotation of the sleeves 22 and the fins or spokes 24 carrying with them the discs 25 and causing the tools 30 to perform their work. Should a stone or other obstruction be encountered by the tool members upon entering the ground, the resiliency imparted to the tool by the discs will allow the tool to recoil from the blow or pass transversely to the left or right of the obstruction without causing damage to the tool or to the driving mechanism.

In Figs. 7 and 8 a sleeve 32 provided with a keyway 33 is adapted to receive a driven shaft similar to that before described. Associated with said sleeve at spaced intervals about its surface are abutments 34 to which are vulcanized or secured in some other suitable fashion blocks of rubber or other resilient material 35. In the preferred embodiment of the invention these blocks of material take the form of a Greek cross as illustrated, although it is apparent that other suitable forms could be employed. Secured to the outer surfaces of said blocks are ring members 36 having inwardly depending abutments 37 which are likewise vulcanized or otherwise secured to the block surfaces. Each of said rings is formed with tool-receiving apertures 38 disposed at opposite sides of said ring intermediate said abutments and each having a shoulder portion 39 for supporting a tool end 40 and a recess 41 into which a clamp 42 is placed and held in position as, for example, by means of a bolt 43. It will thus be seen that in operation resiliency is imparted to the outer ring and the tool member carried thereby because of the flexible coupling through the blocks to the driven shaft. It will also be apparent that any shock or blow imparted to the tool members through the encountering of undersurface obstructions will be lessened through the medium just described and a certain transverse flexibility will likewise be imparted thereto.

In the embodiment shown in Figs. 9 and 10, the sleeve 44 formed with a key-way 45 carries spaced integral discs 46 between which are secured flanges 47. These flanges are placed in opposed relationship between said disc members, at the same time being radially disposed in staggered relationship with respect to the adjacent flange members between adjoining discs, as shown in Fig. 10. Between said flanges is supported a block of rubber or other resilient material 48, formed with a non-circular central opening 49 adapted to receive a complementary tool end 50. This tool end has limiting washers 51 and 52 to confine its longitudinal travel within said blocks, and is secured in place by means of a nut 53 associated with the screw-threaded shank of said tool end. The resilient properties of such a mounting should be apparent at a glance and it will be noted that they extend to transverse movement as well as to the forward or backward path of travel of said tool. It will be further noted that by tightening the nut 53, a compression of the block 48 ensues, which forces the latter into more intimate contact with the flanges 47 and insures the tool member against accidental displacement.

In Fig. 11 a slightly different embodiment of the mounting of the invention is shown, in which the flange members 55 positioned between adjoining discs 55 are formed in a substantial U-shape, with inwardly extending abutments 56 spaced from the bottom thereof. A resilient block of rubber or other material 57 is placed above said inwardly extending abutments and, as shown, is provided with a central opening having flared upper and lower portions 58 and 59. In this type of mounting a tool 60, having a hooked or turned end portion 61, is inserted in the mounting by threading the same at an angle through the flare 58 and through the central opening of the block until it comes to rest in the lower chamber 62 of the flange 54. Thereafter a retaining plate 63 which may be held in position, for example, by means of screw-threaded bolts 64, is put in place, and this plate, by limiting the forward and rearward movement of said tool, prevents the displacement of the end portion 61 with respect to the inwardly projecting abutments 56, and thus effects a locking of the tool within the mounting. This mounting, in common with the others just described, is susceptible to forward and rearward flexibility as well as transverse movement.

In Figs. 12 and 13 the sleeve 65 is preferably made in two portions and these are clamped over and held to the driving means by means of bolts 67 which pass through projecting lugs 68. Between said sleeve and the driving shaft is a band of rubber or other resilient material 69 which may be vulcanized to the drive shaft and/or the sleeve members or may simply be held in place by the tightening of the bolts 67. Said band of rubber imparts a generally yielding connection between the sleeve and the drive shaft and it is designed primarily to absorb any primary shocks or stress imparted to the machine in starting. The sleeve 65 is also provided with outwardly opposed arm members 70 which may be of any desired number and spaced radially about said sleeve.

The outer ends of said arm portions are formed with recesses 71 in which are imbedded blocks of rubber, or other desirable material 72, formed with central openings. The recesses 71 are likewise provided with openings 73 extending rearwardly thereof and of an area greater than that of said central openings through said block. A spring steel holder 74, which may be wedged or vulcanized through the central openings in the block 72 is placed in each of said recesses and thereafter a cover plate 75, likewise formed with an opening 76 to provide egress for said tool, is clamped into position by means of screw 77 and secures the block in place. In such embodiment the resiliency is imparted through a combination of functioning of the spring steel tool holders 74 and the resilient blocks 72. Tools can be bolted or riveted or otherwise fastened to the tool holder.

In the mounting shown in Figure 14, the sleeve 78 is formed with radially extending arm members 79, being formed with openings 80 in which are fitted, by pressure or vulcanizing or any other suitable means, resilient blocks 81 formed of rubber or other suitable material. These blocks carry tool ends 82 which are likewise attached by vulcanizing or other suitable means, and the assembled structure embodies characteristics of resiliency which provide for forward and rearward recoil as well as transverse movement.

Thus, among others, the several objects of the invention, as specifically afore noted, are achieved. Obviously, numerous changes in construction and rearrangement of the parts might be resorted to without departing from the spirit of the invention as defined by the claims.

Having described my invention, what I claim as new and desire to secure by Letters Patent is:

1. As an article of manufacture, a rotary tilling device comprising a driving shaft formed with radially extending fin portions, resilient bands encircling said shaft and being supported on said fin portions, and tool sockets mounted in said resilient members adjacent the periphery thereof.

2. A tilling machine comprising a driving shaft adapted to be coupled to a source of power, radially extending fin portions secured to said driving shaft, a resilient member encircling said shaft and secured to said fin portions, and a plurality of tools carried by said resilient member to be yieldingly driven by the rotation of said shaft.

3. A tilling machine including a driving shaft, radially extending fin portions integral therewith, a resilient disc encircling said shaft and secured to said fins, and tool receiving sockets carried by said disc in spaced relation to one another and said fin receiving portions.

4. A tilling machine including, in combination, a driving shaft adapted to be coupled to a source of power, radially extending fin portions secured thereto, and spaced laterally along said shaft, a plurality of resilient bands encircling said shaft, each secured to at least one of said fin portions, and tool sockets mounted on said resilient members adjacent the periphery thereof.

5. A tilling machine including, in combination, a driving shaft adapted to be coupled to a source of power, radially extending fin portions secured thereto, and spaced laterally along said shaft, a plurality of resilient bands encircling said shaft, each secured to at least one of said fin portions, and tool sockets mounted on said resilient members adjacent the periphery, said tool sockets each being spaced progressively about the periphery of said resilient bands so as not to be in alignment with the tool sockets mounted in an adjacent band.

6. A tilling machine comprising a driving shaft formed with a plurality of radially extending fin portions, a resilient band encircling said shaft and engaging said fin portions, non-resilient tool sockets mounted on said resilient member adjacent the periphery thereof, and tools removably held in said tool sockets for yielding rotation therewith.

CADWALLADER WASHBURN KELSEY.